(12) United States Patent
Poruri et al.

(10) Patent No.: US 9,949,176 B2
(45) Date of Patent: Apr. 17, 2018

(54) WIRELESS COMMUNICATION APPARATUS AND METHOD

(71) Applicants: Raman Poruri, Hyderabad (IN); Rawoof Mohammad, Ameenpur (IN)

(72) Inventors: Raman Poruri, Hyderabad (IN); Rawoof Mohammad, Ameenpur (IN)

(73) Assignee: NXP USA, INC., Austin, TX (US)

( * ) Notice: Subject to any disclaimer, the term of this patent is extended or adjusted under 35 U.S.C. 154(b) by 652 days.

(21) Appl. No.: 14/537,872

(22) Filed: Nov. 10, 2014

(65) Prior Publication Data

US 2016/0135096 A1 May 12, 2016

(51) Int. Cl.
*H04W 36/00* (2009.01)
*H04W 92/20* (2009.01)
*H04W 36/02* (2009.01)

(52) U.S. Cl.
CPC ...... *H04W 36/0061* (2013.01); *H04W 36/023* (2013.01); *H04W 92/20* (2013.01)

(58) Field of Classification Search
CPC ....... H04W 88/10; H04W 92/16; H04W 8/14; H04W 36/02; H04W 88/08; H04W 88/085
See application file for complete search history.

(56) References Cited

U.S. PATENT DOCUMENTS

| 9,456,391 | B2* | 9/2016 | Takahashi | H04W 76/04 |
| 9,526,049 | B2 | 12/2016 | Yuk et al. | |
| 2008/0273503 | A1 | 11/2008 | Lee | |
| 2010/0238903 | A1 | 9/2010 | Kitazoe | |
| 2011/0213758 | A1* | 9/2011 | Cao | H04L 67/306 707/691 |
| 2014/0057627 | A1* | 2/2014 | Hejazi | H04W 28/08 455/424 |
| 2014/0328178 | A1 | 11/2014 | Haberland et al. | |
| 2015/0023278 | A1 | 1/2015 | Boccardi et al. | |

* cited by examiner

*Primary Examiner* — Robert M Morlan

(57) ABSTRACT

A wireless communication device executes first and second virtual transmission nodes in a wireless communication network. The wireless communication device includes a database for storing identification information of the first and second virtual transmission nodes, and a centralized service unit for accessing the database. When a handover from the first virtual transmission node to the second virtual transmission node occurs, the first virtual transmission node requests the centralized service unit to check whether the second virtual transmission node is co-located in the wireless communication device, and forwards buffered data packets to the second virtual transmission node internally without IPsec processing.

18 Claims, 4 Drawing Sheets

WIRELESS COMMUNICATION APPARATUS AND METHOD

BACKGROUND OF THE INVENTION

The present invention relates to a wireless communication apparatus and method, and, more particularly, to a method for optimizing X2 based handover within a virtual eNodeB pool.

FIG. 1 shows a conventional wireless communication network 100 including a plurality of eNodeBs such as eNB_1 102, eNB_2 104, eNB_3 106 and eNB_4 108. An eNodeB (Evolved Node B) is a node that is connected to a mobile phone network that communicates directly with mobile handsets, like a base transceiver station. The eNodeBs eNB_1 102, eNB_2 104 and eNB_3 106 are virtual eNodeBs co-located in a wireless communication device 110, which is a virtual eNodeB pool, in which aggregated basebands (BBs) BB_1-BB_6 are virtually unbundled and assigned to the virtual eNodeBs eNB_1 102, eNB_2 104 and eNB_3 106. The plurality of eNodeBs eNB_1 102, eNB_2 104, eNB_3 106 and eNB_4 108 communicate with each other through an X2 interface, and respectively communicate with a core network 112, such as an evolved packet core network (EPC) through an S1 interface. The core network 112 includes a mobility management entity (MME), a serving gateway (S-GW) and a packet data node gateway (P-GW), which is known in the art. A user equipment (UE) 114 is communicating with the virtual eNodeB eNB_1 102. When a handover between the virtual eNodeBs eNB_1 102 and eNB_2 104 occurs, it would be inefficient to forward packets over the X2 interface between the two virtual eNodeBs, which are co-located in the wireless communication device 110, since the packets would be transmitted out of the wireless communication device 110 after applying security, and received back to the wireless communication device 110 through the core network 112, which causes unnecessary processing overhead of Internet Protocol Security (IPsec) processing and external routing for the packets. It is therefore desirable to optimize an X2 based handover within the virtual eNodeB pool.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
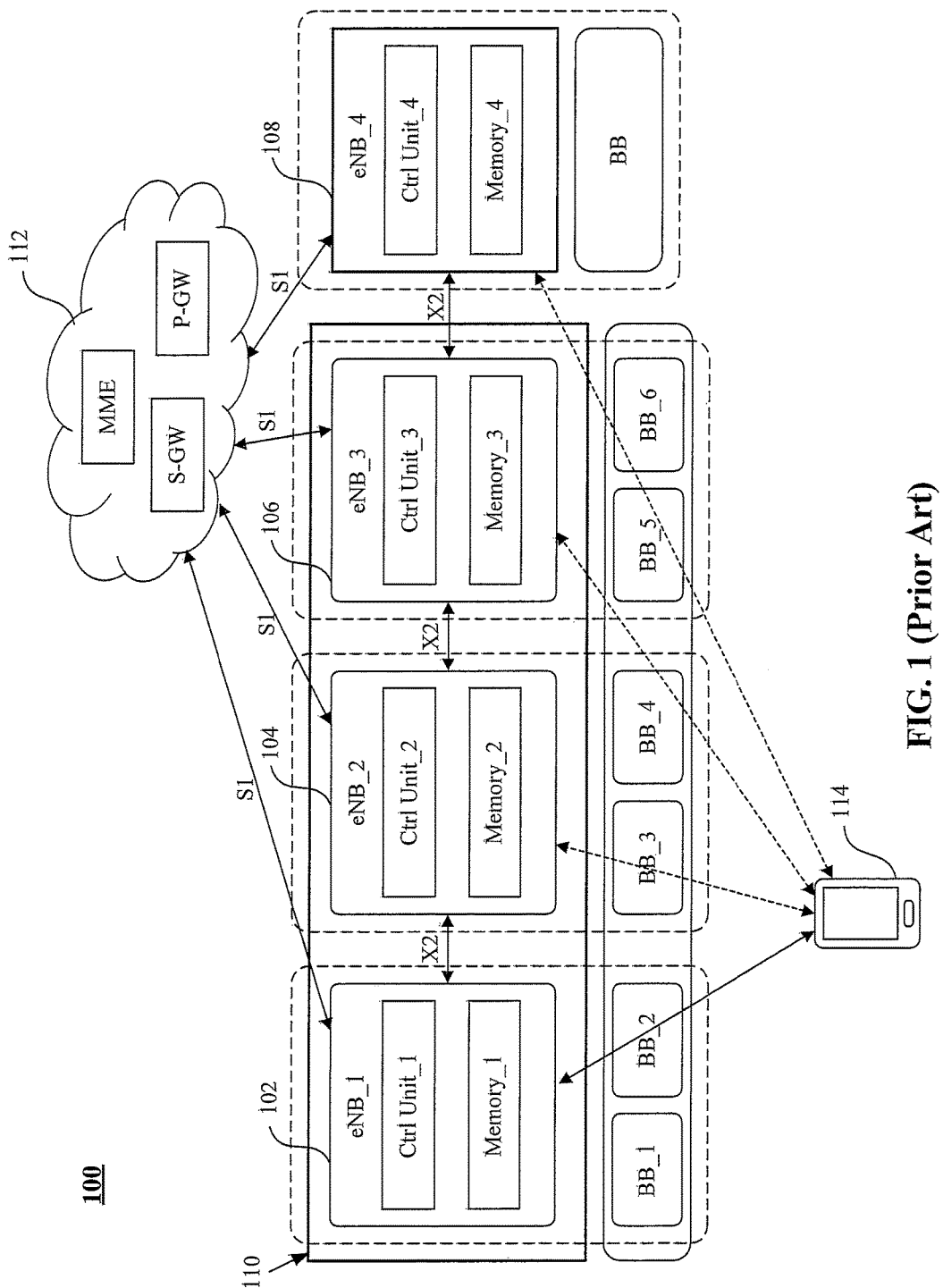
FIG. 1 shows a conventional wireless communication network.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a wireless communication device executing at least first and second virtual transmission nodes in a wireless communication network. The wireless communication device includes a transmitting and receiving unit for communicating with other wireless communication devices in the network, and a memory connected to the transmitting and receiving unit. The memory includes at least first and second buffers respectively configured for the first and second virtual transmission nodes, and a database for storing identification information of the first and second virtual transmission nodes. The first buffer stores at least one data packet to be transmitted to a mobile node in the network. The wireless communication device further includes a processor connected to the transmitting and receiving unit and the memory. The processor includes at least first and second control units respectively configured for the first and second virtual transmission nodes, and a centralized service unit for accessing the database. After a handover from the first virtual transmission node to a target transmission node occurs, the first control unit sends a request with identification information of the target transmission node to the centralized service unit to check whether the identification information is registered in the database.

In another embodiment, the present invention provides a method of operating a wireless communication device that executes at least first and second virtual transmission nodes in a wireless communication network. The wireless communication device includes a first buffer for storing at least one data packet to be transmitted to a mobile node in the network. The method includes registering identification information of the first and second virtual transmission nodes in a database of the wireless communication device, and upon a handover decision from the first virtual transmission node to a target transmission node, sending a request with identification information of the target transmission node to a centralized service unit of the wireless communication device to determine whether the target transmission node identification information is stored in the database.

Figure 2:
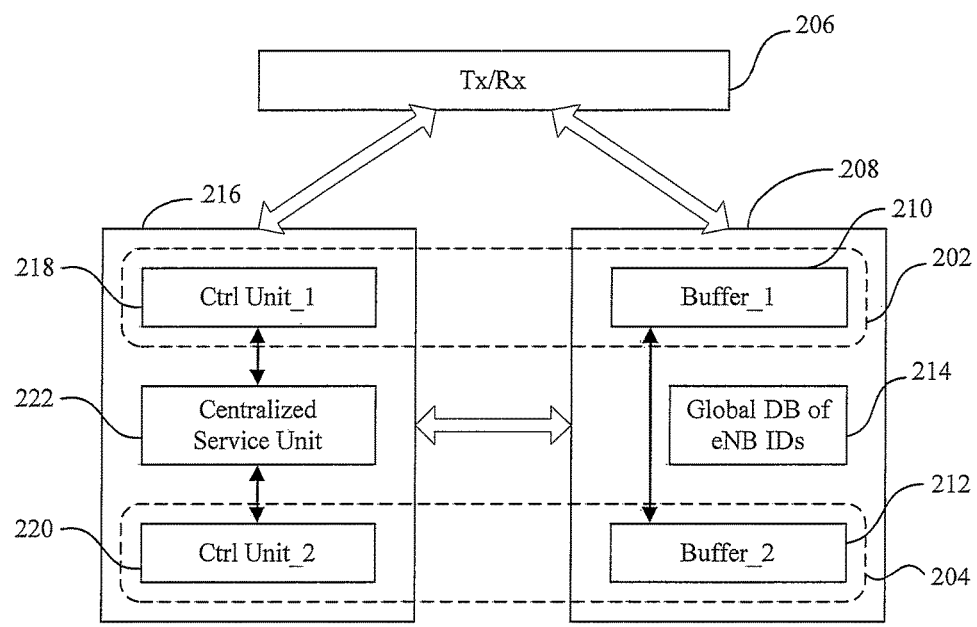
FIG. 2 is a schematic block diagram of a wireless communication device in accordance with an embodiment of the invention.

Referring now to FIG. 2, an internal structure of a wireless communication device 200 in a wireless communication network in accordance with an embodiment of the invention is shown. The wireless communication device 200 executes at least first and second virtual transmission nodes 202 and 204. The virtual transmission node 202 or 204 may be a virtual eNodeB or a virtual relay node, which transmits downlink data packets to a mobile node in an area covered by the virtual transmission node. The mobile node may be the UE 114 shown in FIG. 1, or a mobile relay node (not shown), as is known in the art.

The wireless communication device 200 has a transmitting and receiving unit 206 for communicating with other wireless communication devices in the network such as mobile nodes or transmission nodes, and a memory 208 connected to the transmitting and receiving unit 206. The memory 208 includes at least first and second buffers 210 and 212 respectively configured for the at least first and second virtual transmission nodes 202 and 204, and a database 214 for storing identification information of the at least first and second virtual transmission nodes 202 and 204. In a preferred embodiment, the identification information comprises E-UTRAN Cell Global Identifier (ECGI) value of the first and second virtual transmission nodes 202 and 204. The first buffer 210 stores at least one data packet to be transmitted to the UE 114. The memory 208 can be a RAM or part of an internal memory (RAM) of a microcontrol unit (MCU) of the wireless communication device 200.

The wireless communication device 200 further includes a processor 216 connected to the transmitting and receiving unit 206 and the memory 208. The processor 216 includes at least first and second control units 218 and 220 respectively configured for the at least first and second virtual transmission nodes 202 and 204, and a centralized service unit 222 for accessing the database 214. In a preferred embodiment, the first and second control units 218 and 220 provide the identification information of the first and second virtual transmission nodes 202 and 204 to the database 214 during boot procedures. In a preferred embodiment, providing the identification information is performed as a part of "S1 attach" or "X2 attach" procedures. The processor 216 can be a processor of an MCU of the wireless communication device 200, or alternatively could be a separate processor within the wireless communication device 200.

The first virtual transmission node 202, which is a source transmission node, makes a handover decision based on a measurement report sent from the UE 114, wherein the measurement report includes an ID of a target cell covered by a target transmission node. When a handover from the first virtual transmission node 202 to a target transmission node occurs, the first control unit 218 extracts identification information of the target transmission node based on the ID of the target cell, and sends a request with identification information of the target transmission node to the centralized service unit 222. In a preferred embodiment, the first control unit 218 creates an X2 application protocol (X2AP) session with an X2AP session ID for forwarding the at least one data packet to the target transmission node during handover.

The centralized service unit 222 accesses the database 214 to check whether the identification information of the target transmission node is registered in the database 214. If the identification information of the target transmission node matches the identification information of the second virtual transmission node 204 that is co-located in the wireless communication device 200, the first control unit 218 marks the X2AP session for internal data packet forwarding of user-plane traffic over X2 tunnels, and sends a handover request to the second virtual transmission node 204, wherein the handover request includes identification information of the first virtual transmission node 202 and the X2AP session ID.

Upon receipt of the handover request, the second control unit 220 of the second virtual transmission node 204 sends a request with identification information of the first virtual transmission node 202 to the centralized service unit 222.

The centralized service unit 222 accesses the database 214 to check whether the identification information of the first virtual transmission node 202 is registered in the database 214. If the first virtual transmission node 202 is co-located in the wireless communication device 200, the second control unit 220 marks the X2AP session for internal data packet forwarding, and marks user-plane sessions for internal data packet forwarding by creating a dynamic IPsec bypass policy for incoming X2 traffic from the first virtual transmission node 202 via the X2AP session, and sends a handover request acknowledgement to the first virtual transmission node 202. In one embodiment, the handover request acknowledgement includes the X2AP session ID.

Upon receipt of the handover request acknowledgement, the first control unit 218 creates dynamic IPsec bypass policy for outgoing X2 traffic to the second virtual transmission node 204 via the X2AP session, and sends a handover command to the UE 114 so that the UE 114 detaches from the first virtual transmission node 202 and connects to the second virtual transmission node 204. The first control unit 218 forwards the at least one data packet to the second virtual transmission node via an internal channel of the wireless communication device 200, wherein the internal channel bypasses IPsec processing and avoids external routing. In a preferred embodiment, the at least one data packet is forwarded from the first buffer 210 to the second buffer 212 within the wireless communication device 200.

Figure 3:
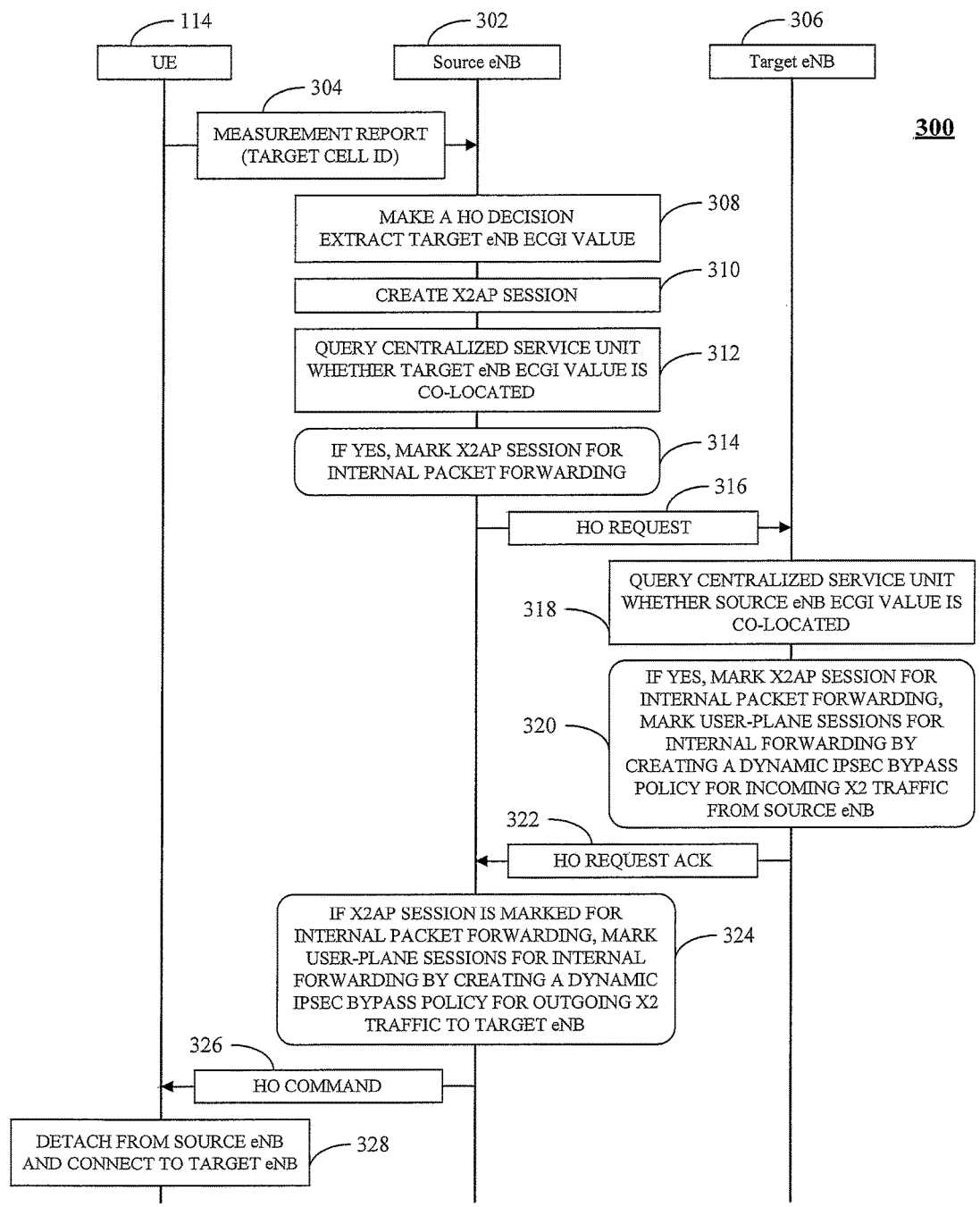
FIG. 3 is a flow chart of a method for determining co-located virtual eNodeBs of a handover procedure in accordance with an embodiment of the invention.
Figure 4:
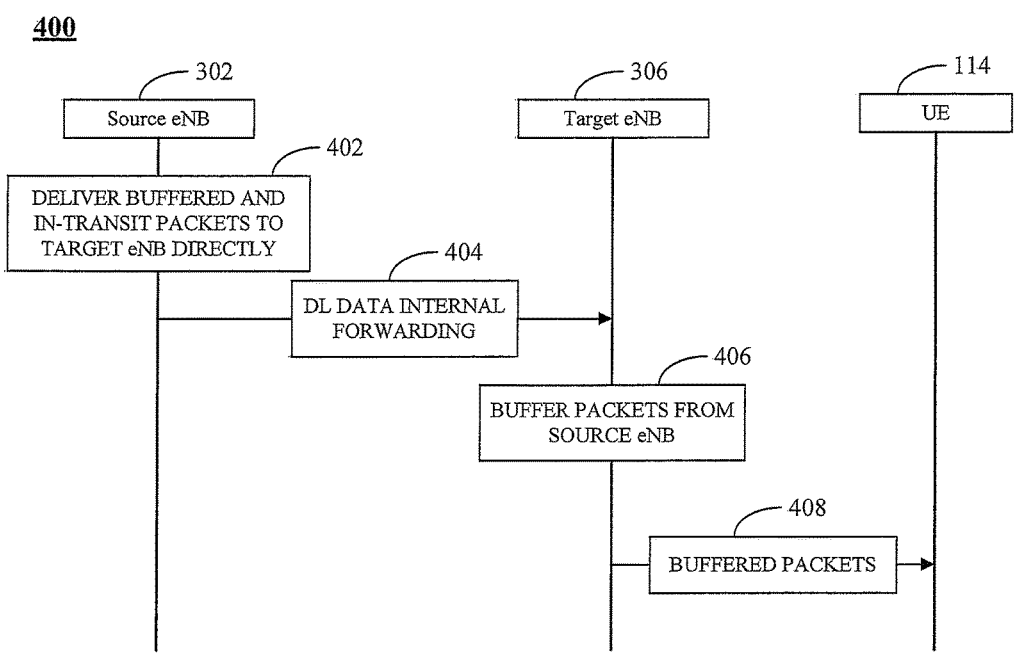
FIG. 4 is a flow chart of a data packet forwarding method of a handover procedure between virtual eNodeBs co-located in one wireless communication device in accordance with an embodiment of the invention.

FIGS. 3 and 4 are a series of flow charts showing the steps of a method for optimizing X2 based handover within a virtual eNodeB pool.

FIG. 3 is a flow chart of a method 300 for determining co-located virtual eNodeBs in a handover procedure in accordance with an embodiment of the invention.

The UE 114 is receiving downlink data packets from a source eNodeB 302 in a wireless communication network, where the source eNodeB 302 is the first virtual transmission node 202 in the wireless communication device 200. The source eNodeB 302 has at least one data packet that is to be sent to the UE 114.

The wireless communication device 200 executes at least the first virtual transmission node 202 and a second virtual transmission node 204. The virtual transmission node 202 or 204 may be a virtual eNodeB or a virtual relay node, which transmits downlink data packets to a mobile node in an area covered by the virtual transmission node. The mobile node may be the UE 114, or a mobile relay node (not shown), as is known in the art. The wireless communication device also includes a database 214 for storing identification information of the at least first and second virtual transmission nodes 202 and 204, and a centralized service unit 222 for accessing the database 214. In a preferred embodiment, the identification information is registered in the database during boot procedures. In a preferred embodiment, providing the identification information is performed as a part of "S1 attach" or "X2 attach" procedures.

At step 304, the UE 114 sends a measurement report to the source eNodeB 302, wherein the measurement report includes an ID of a target cell covered by a target eNodeB 306 in the wireless communication network, the target eNodeB 306 is the second virtual transmission node 204 in the wireless communication device 200.

At step 308, the source eNodeB 302 makes a handover decision based on the measurement report, and extracts identification information of the target eNodeB 306 from the measurement report. In a preferred embodiment, the identification information includes an E-UTRAN Cell Global Identifier (ECGI) value.

At step 310, the source eNodeB 302 creates an X2AP session with an X2AP session ID for forwarding the at least one data packet to the target eNodeB 306 during handover.

At step 312, the source eNodeB 302 sends a request with identification information of the target eNodeB 306 to the centralized service unit 222 to check whether the target eNodeB 306 is co-located in the wireless communication device 200. In a preferred embodiment, the centralized service unit 222 accesses the database 214 to check whether the identification information of the target eNodeB 306 is registered in the database 214.

At step 314, if the target eNodeB 306 is co-located in the wireless communication device 200, the source eNodeB 302 marks the X2AP session for internal data packet forwarding.

At step 316, the source eNodeB 302 sends a handover request to the target eNodeB 306, where the handover request includes identification information of the source eNodeB 302 and the X2AP session ID.

At step 318, upon receipt of the handover request, the target eNodeB 306 sends a request with identification information of the source eNodeB 302 to the centralized service unit 222 to check whether the source eNodeB 302 is co-located in the wireless communication device 200. In a preferred embodiment, the centralized service unit 222 accesses the database 214 to check whether the identification information of the source eNodeB 302 is registered in the database 214.

At step 320, if the source eNodeB 302 is co-located in the wireless communication device 200, the target eNodeB 306 marks the X2AP session for internal data packet forwarding, and marks user-plane sessions for internal data packet forwarding by creating a dynamic IPsec bypass policy for incoming X2 traffic from the source eNodeB 302.

At step 322, the target eNodeB 306 sends a handover request acknowledgement to the source eNodeB 302, where the handover request acknowledgement includes the X2AP session ID.

At step 324, upon receipt of the handover request acknowledgement, if the X2AP session has been marked for internal data packet forwarding, the source eNodeB 302 marks user-plane sessions for internal data packet forwarding by creating a dynamic IPsec bypass policy for outgoing X2 traffic to the target eNodeB 306.

At steps 326 and 328, the source eNodeB 302 sends a handover command to the UE 114, and upon receipt the handover command, the UE 114 detaches from the source eNodeB 302 and connects to the target eNodeB 306.

FIG. 4 is a flow chart of a data packet forwarding method 400 in a handover procedure between virtual eNodeBs co-located in one wireless communication devices in accordance with an embodiment of the invention.

At steps 402 and 404, if the source eNodeB 302 and the target eNodeB 306 are virtual eNodeBs co-located in the wireless communication device 200, the source eNodeB 302 forwards the at least one data packet that is to be sent to the UE 114 to the target eNodeB 306 internally without IPsec processing.

At step 406, the target eNodeB 306 received and buffered the at least one data packet so that the at least one data packet is sent to the UE 114 from the target eNodeB 306 at step 408.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A wireless communication device executing at least first and second virtual transmission nodes in a wireless communication network, comprising:

a transmitting and receiving unit for communicating with other wireless communication devices in the network;

a memory connected to the transmitting and receiving unit, wherein the memory comprises at least first and second buffers respectively configured for the at least first and second virtual transmission nodes, and a database for storing identification information of the at least first and second virtual transmission nodes, wherein the first buffer stores at least one data packet to be transmitted to a mobile node in the network; and a processor connected to the transmitting and receiving unit and the memory, wherein the processor comprises at least first and second control units respectively configured for the at least first and second virtual transmission nodes, and a centralized service unit for accessing the database, wherein after a handover from the first virtual transmission node to a target transmission node occurs, the first control unit sends a request with identification information of the target transmission node to the centralized service unit to check whether the identification information is registered in the database, the first control unit to create an X2 Application Protocol (X2AP) session with X2AP session identification information, to mark the X2AP session for internal data packet forwarding and to create a dynamic IPsec bypass policy for incoming X2 traffic from the target virtual transmission node if the target virtual transmission node identification information is registered in the database, and sends a handover request acknowledgement comprising the X2AP session identification information to the target virtual transmission node, the target transmission node to transmit data to the first virtual transmission node via the dynamic IPsec bypass policy.

2. The wireless communication device of claim 1, wherein the first control unit forwards the at least one data packet to the second virtual transmission node via an internal channel of the wireless communication device if the identification information of the target transmission node matches the identification information of the second virtual transmission node.

3. The wireless communication device of claim 2, wherein the internal channel bypasses Internet Protocol Security (IPsec).

4. The wireless communication device of claim 2, wherein the second control unit stores the at least one data packet in the second buffer.

5. The wireless communication device of claim 1, wherein the first and second control units provide the identification information of the first and second virtual transmission nodes to the database during boot procedures.

6. The wireless communication device of claim 1, wherein the first control unit makes a decision of the handover based on a measurement report received from the mobile node, wherein the measurement report comprises the target transmission node identification information.

7. The wireless communication device of claim 1, wherein the second control unit sends a request with the first virtual transmission node identification information to the centralized service unit to determine whether the first virtual transmission node identification information is registered in the database.

8. A wireless communication device executing at least first and second virtual transmission nodes in a wireless communication network, comprising:
   a transmitting and receiving unit for communicating with other wireless communication devices in the network;
   a memory connected to the transmitting and receiving unit, wherein the memory comprises at least first and second buffers respectively configured for the at least first and second virtual transmission nodes, and a database for storing identification information of the at least first and second virtual transmission nodes, wherein the first buffer stores at least one data packet to be transmitted to a mobile node in the network; and
   a processor connected to the transmitting and receiving unit and the memory, wherein the processor comprises at least first and second control units respectively configured for the at least first and second virtual transmission nodes, and a centralized service unit for accessing the database,
   wherein after a handover from the first virtual transmission node to a target transmission node occurs, the first control unit sends a request with identification information of the target transmission node to the centralized service unit to check whether the identification information is registered in the database,
   wherein the first control unit creates an X2 Application Protocol (X2AP) session with X2AP session identification information, marks the X2AP session for internal data packet forwarding if the target transmission node is the second virtual transmission node, and sends a handover request comprising the first virtual transmission node identification information and the X2AP session identification information to the second virtual transmission node,
   wherein the second control unit sends a request with the first virtual transmission node identification information to the centralized service unit to determine whether the first virtual transmission node identification information is registered in the database,
   wherein the second control unit marks the X2AP session for internal data packet forwarding and creates a dynamic IPsec bypass policy for incoming X2 traffic from the first virtual transmission node if the first virtual transmission node identification information is registered in the database, and sends a handover request acknowledgement comprising the X2AP session identification information to the first virtual transmission node, the first virtual transmission node to transmit data to the second virtual transmission node if the dynamic IPsec bypass policy.

9. The wireless communication device of claim 8, wherein the first control unit creates the dynamic IPsec bypass policy for outgoing X2 traffic to the second virtual transmission node upon receipt of the handover request acknowledgement.

10. A method of operating a wireless communication device that executes at least first and second virtual transmission nodes in a wireless communication network, wherein the wireless communication device comprises a first buffer for storing at least one data packet to be transmitted to a mobile node in the network, the method comprising:
   registering identification information of the first and second virtual transmission nodes in a database of the wireless communication device, wherein the first and second virtual transmission nodes are implemented in first and second control units of a processor of the wireless communication device;
   upon a handover decision from the first virtual transmission node to a target transmission node, sending a request with identification information of the target transmission node to a centralized service unit of the wireless communication device to determine whether the target transmission node identification information is stored in the database;
   creating a dynamic IPsec bypass policy in the second virtual transmission node for incoming X2 traffic from the first virtual transmission node if first virtual transmission node identification information is stored in the database;
   sending a handover request acknowledgement from the second virtual transmission node to the first virtual transmission node, wherein the handover request acknowledgement comprises the X2AP session identification information; and
   transmitting, by the first virtual transmission node, data to the second virtual transmission node via the dynamic IPsec bypass policy.

11. The method of claim 10, further comprising:
   forwarding the at least one data packet from the first virtual transmission node to the second virtual transmission node via an internal channel of the wireless communication device.

12. The method of claim 11, wherein the internal channel bypasses Internet Protocol Security (IPsec).

13. The method of claim 11, further comprising: storing the at least one data packet in a second buffer of the second virtual transmission node.

14. The method of claim 10, wherein the identification information of the first and second virtual transmission nodes are stored in the database during boot procedures.

15. The method of claim 10, further comprising: making the handover decision based on a measurement report received from the mobile node, wherein the measurement report comprises the identification information of the target transmission node.

16. The method of claim 10, further comprising:
   creating an X2 Application Protocol (X2AP) session with X2AP session identification information;
   marking the X2AP session for internal data packet forwarding if the target transmission node is the second virtual transmission node; and
   sending a handover request that comprises the identification information of the first virtual transmission node and the X2AP session identification information from the first virtual transmission node to the second virtual transmission node.

17. The method of claim 16, further comprising:
   sending a request with the identification information of the first virtual transmission node from the second virtual transmission node to the centralized service unit to determine whether the identification information of the first virtual transmission node is stored in the database.

18. The method of claim 10, further comprising:
   creating the dynamic IPsec bypass policy in the first virtual transmission node for outgoing X2 traffic to the second virtual transmission node upon receipt of the handover request acknowledgement.

* * * * *